United States Patent
Begin

[19]

[11] Patent Number: 5,998,991
[45] Date of Patent: Dec. 7, 1999

[54] PICKUPLESS MAGNETOSTRICTIVE POSITION MEASUREMENT APPARATUS

[75] Inventor: John D. Begin, Sterling Heights, Mich.

[73] Assignee: Patriot Sensors and Controls, Clawson, Mich.

[21] Appl. No.: 08/969,152

[22] Filed: Nov. 10, 1997

[51] Int. Cl.$^6$ .............................. G01B 7/14; G01B 7/26; G01F 23/30; G01F 23/40
[52] U.S. Cl. .................... 324/207.13; 73/313; 73/314; 73/290 V; 324/207.24
[58] Field of Search ..................... 324/207.13, 207.17, 324/207.24; 73/290 V, 313, 314; 333/148

[56] References Cited

U.S. PATENT DOCUMENTS

| | | |
|---|---|---|
| 4,071,818 | 1/1978 | Krisst . |
| 4,654,590 | 3/1987 | Kitaura et al. . |
| 4,678,993 | 7/1987 | Vinnemann et al. . |
| 4,839,590 | 6/1989 | Koski et al. . |
| 4,939,457 | 7/1990 | Tellerman . |
| 4,943,773 | 7/1990 | Koski et al. . |
| 4,958,332 | 9/1990 | Tellerman . |
| 5,017,867 | 5/1991 | Dumais et al. . |
| 5,050,430 | 9/1991 | Begin et al. . |
| 5,076,100 | 12/1991 | Hunter et al. . |
| 5,136,884 | 8/1992 | Lovett . |
| 5,196,791 | 3/1993 | Dumais . |
| 5,212,444 | 5/1993 | Abramovich et al. . |
| 5,258,707 | 11/1993 | Begin et al. . |
| 5,274,328 | 12/1993 | Begin et al. . |
| 5,313,160 | 5/1994 | Golden et al. . |
| 5,406,200 | 4/1995 | Begin et al. . |
| 5,412,316 | 5/1995 | Dumais et al. . |
| 5,473,245 | 12/1995 | Silvus, Jr. et al. . |
| 5,583,433 | 12/1996 | Sawa .................................. 324/207.13 |

*Primary Examiner*—Gerard Strecker
*Attorney, Agent, or Firm*—Young & Basile, P.C.

[57] ABSTRACT

A method and apparatus for determining the position of a movable object along a magnetostrictive wire having first and second opposed ends. A first electrical excitation pulse is applied to a two-wire circuit including the magnetostrictive wire and propagates along the wire to the position of a movable magnet surrounding the wire. The magnet generates oppositely directed first and second torsional waves in the wire. One torsional wave propagates along the wire to a reflective termination at the second end of the wire and is reflected back toward the magnet where it interacts with the magnetic field of the magnet to induce a return electrical pulse in the two-wire circuit. The position of the magnet along the wire is determined from the time differential between the first and second electrical pulses in the two-wire circuit. In another embodiment, a second magnet is mounted in a fixed position about the wire and generates oppositely directed third and fourth torsional waves in response to the first excitation signal, one of which propagates along the wire toward the first magnet which induces an electromagnetic force in the two-wire circuit. A torsional wave generated by the first movable magnet in response to the excitation signal induces another electromotive force in the two-wire circuit when it propagates to the second magnet.

12 Claims, 2 Drawing Sheets

PICKUPLESS MAGNETOSTRICTIVE POSITION MEASUREMENT APPARATUS

FIELD OF THE INVENTION

The present invention relates, in general, to magnetostrictive position transducers.

BACKGROUND OF THE INVENTION

The phenomenon of magnetostriction has been widely employed in linear distance and position measuring devices. A magnet located near or around a magnetostrictive wire marks the location to be measured. Such devices can operate with either mechanical or electrical excitation. When an acoustical/mechanical strain propagating along the wire reaches the area of influence of the magnet, an electrical signal is generated in the wire. Conversely, when an electrical signal propagating along the wire reaches the area of influence of the magnet, a torsional strain is generated in the wire.

Such linear position detectors using a magnet mounted in a float have been utilized as liquid level detectors to provide an indication of a level of liquid within a tank, such as an underground tank. The position of the magnet, and hence, the liquid level, is determined as a function of time required for a torsional disturbance to propagate from one end of the wire through the area of influence of the magnet, in the case of mechanical excitation, or from the position of the magnet to a sensing apparatus located at one end of the wire in the case of electrical excitation.

Other types of magnetostrictive position measuring devices utilize a reflective termination at the foot end of the magnetostrictive wire. Such devices measure the difference between the propagation times of a pulse from the magnet position to the foot of the wire and reflected back to the head of the device and a pulse traveling on the wire directly from the magnet to the head.

As shown in U.S. Pat. Nos. 4,839,590; 5,017,867; 5,050,430; and 5,253,521, all of which are assigned to the assignee of the present invention, such magnetostrictive devices typically include an elongated, small diameter tube, typically made of stainless steel, on which a movable magnet is mounted for providing an indication of a liquid level. A head and cap are mounted on one end of the tube, typically above the liquid level, and enclose electronic components, such as terminal connections and a signal conditioning circuit used to supply or output signals to and from the magnetostrictive wire in the tube.

At least one transducer is mounted at one end of the magnetostrictive wire, usually within a head or housing mounted at one end of the tube, to generate the torsional pulse for propagation along the wire or to detect a torsional pulse generated through the interaction of an initial excitation signal propagated along the wire and the movable magnet. However, such transducers require special mounts, substrates and/or clamps for attachment to the magnetostrictive wire or to dispose the transducer in a surrounding relationship with respect to the wire. These additional components add to the overall cost of the position measurement device as well as increasing the assembly time of the device. More importantly, such components consume a considerable amount of space thereby requiring the typically enlarged diameter head mounted at one end of the tube surrounding the magnetostrictive wire. This enlarged head limits the application of a magnetostrictive position measurement apparatus only to those applications which can accommodate the large diameter head. Other applications, such as underground tanks having small diameter access ports, will not accommodate the enlarged head without major modification.

Thus, it would be desirable to provide a magnetostrictive position measurement apparatus which is capable of detecting a position of a movable object without a transducer. It would also be desirable to provide a magnetostrictive position measurement apparatus which is capable of determining the position of a movable magnet associated with a movable component, such as liquid level within a tank, without using a transducer while still having sufficient sensitivity to detect signals propagating along a magnetostrictive wire. It would be desirable to provide a magnetostrictive position measurement apparatus which has a small overall size or diameter for use in many different applications.

It would be desirable to provide a magnetostrictive position measurement apparatus which eliminates the possibility of failure of the transducer or the effects of any transducer based temperature drift.

SUMMARY OF THE INVENTION

The present invention is a pickupless magnetostrictive position measurement apparatus.

In one embodiment, the magnetostrictive position measurement apparatus includes a two-wire circuit formed of a magnetostrictive wire extending through a measurement field. A magnet is displacable along the measurement field of the magnetostrictive wire.

Means are provided for transmitting an electrical current excitation pulse to the two-wire circuit. The magnet interacts with the current pulse to induce a torsional strain in the magnetostrictive wire. The torsional strain simultaneously propagates in opposite directions from the magnet as a pair of first and second torsional waves along the magnetostrictive wire. In this embodiment, a dampening means dampens the first torsional pulse received at one end of the waveguide. A reflecting means reflects the second torsional pulse from the second end of the wire back along the wire toward the magnet. The magnet converts the second torsional pulse to an electromotive force or signal in the two-wire circuit.

Means are provided for determining the time difference between the initial electrical excitation pulse and the return signal or pulse in the two-wire circuit, with the time differential being indicative of the position of the magnet along the measurement field of the magnetostrictive waveguide relative to the reflector.

The magnetostrictive wire may be mounted within a magnetically transmissive tube, such as a brass or stainless steel tube, and centrally spaced within the tube by means of longitudinally disposed spacers. The magnetically transmissive tube may, in turn, be spacedly mounted within an outer tube on which the magnet is movably mounted.

In another embodiment, both ends of the magnetostrictive wire in the two-wire circuit are dampened. A second magnet is fixedly mounted along the magnetostrictive wire in a reference location relative to the measurement field. Each magnet generates a pair of oppositely directed torsional waves in response to the first excitation signal applied to a two-wire circuit. One torsional wave of each pair of torsional waves generated by each of the first and second magnets generates an electromotive force in the two-wire circuit through the interaction of the torsional wave and the magnetic field of the other magnet when the torsional wave propagates along the magnetostrictive wire to the position of the other magnet. The two electromotive forces generated by the two magnets produce two currents which are additive to effectively double the amplitude of the return signal in the two-wire circuit.

The pickupless magnetostrictive position measurement apparatus of the present invention uniquely provides a position measurement signal of an object movable through a measurement field of the magnetostrictive waveguide without a pickup element or transducer coupled to one end of the waveguide. This not only reduces the number of components and assembly time of the magnetostrictive position measurement apparatus, but, also, reduces the head end of the waveguide. This enables the use of the present waveguide in many different applications, including applications which were previously not able to use magnetostrictive position measurement apparatus due to the typically large diameter head end of such apparatus. By eliminating the pickup elements or transducer, the present apparatus also eliminates the possibility of failure of the pickup as well as the effects of transducer based temperature drift.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
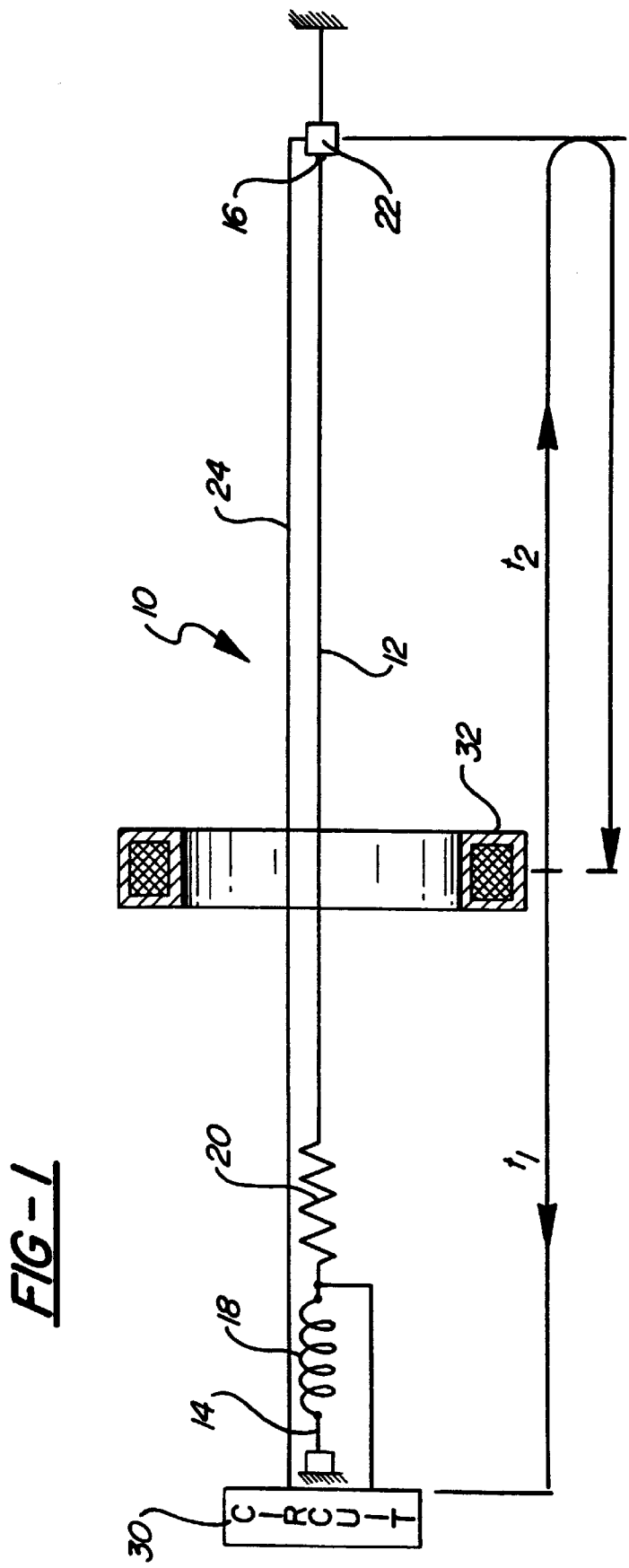
FIG. 1 is a pictorial representation of the operation of the magnetostrictive position measurement apparatus according to one embodiment of the present invention.

Referring now to FIG. 1, there is depicted a pictorial representation of one embodiment of the present invention. In this embodiment, the magnetostrictive position measurement apparatus 10 includes a wire 12 having magnetostrictive characteristics, such as a wire formed of a nickel/iron alloy. A material known as Ni-Span-C is suitable for use as the wire 12. The wire 12 has a first end 14 and an opposed second end 16. The first and second ends 14 and 16 are fixedly connected to support structure. A biasing means 18, such as a tension spring, is connected to either of the first and second ends 14 and 16, such as the first end 14 of the wire 12, to exert a biasing force on the wire 12 to maintain the wire 12 in a straight, elongated form.

A dampening means 20, such as a resilient pad coupled to the wire 12, is attached to the wire 12 near the first end 14 to dampen any sonic or torsional waves which propagate along the wire 12 at the first end 14 of the wire 12. The dampening means or dampener 20 prevents any reflection of torsional waves back along the wire 12.

The second end 16 of the wire 12 is secured to a reflection means, such as a reflective termination or collar 22. The reflection means or collar 22 comprises, in an exemplary embodiment, a torus formed of a non-magnetic material, such as brass, and having a bore receiving the wire 12 and a set screw or solder, not shown, to fix the wire 12 to the collar 22. The reflection means or collar 22 provides a mass discontinuity on the wire 12 which serves to reflect a sonic or torsional pulse arriving at the second end 16 of the wire 12 back toward the first end 14.

A return wire 24 is coupled to the reflection collar 22 and extends toward the first end 14 of the wire 12. Alternately, the return wire 24 may include a short wire connected between the collar 22 and a tube surrounding the wire 12, as described hereafter. Another short lead or wire extends from an opposite end of the tube.

As shown in FIG. 1, a circuit means 30 for generating an electrical excitation pulse, such as an electrical current pulse or signal, is connected to the first end 14 of the wire 12 as well as to the return or second wire 24 to form a complete circuit between the first and second ends 14 and 16 of the wire 12. The circuit means 30 acts as a driver circuit to supply electrical current pulses to the wire 12. A driver circuit shown in U.S. Pat. No. 5,406,200, and assigned to the assignee of the present invention, may be used for the circuit 30 of the present invention, except for the use of the pickup transducer described therein. The contents of this patent, with respect to the driver circuit, are incorporated herein by reference.

The wire 12 and return wire 24 form a two-wire current loop which provides a current output when a voltage is applied thereto to indicate the position of a magnet 32 within a measurement field along the length of the wire 12 between the first and second ends 14 and 16. In conjunction with this excitation, the two wires 12 and 24 may be used, without a pickup element or transducer, to provide an output pulse or signal indicative of the propagation time being measured.

A magnet 32 is disposed about the wire 12 and is movable through a measurement field between the first and second ends 14 and 16 of the wire 12. By way of example, the magnet 32 is a toroidal permanent magnet which is movable longitudinally or axially along an outer tube surrounding the wire 12, as described hereafter. The magnet 32 may be mechanically attached to a movable object whose position is to be monitored. Alternately, the magnet 32 may be mounted within a float so as to remain positioned at the surface or liquid level of liquid within a tank.

In an operation, the circuit means 30 applies an electrical excitation current pulse to the two-wire circuit formed of the wires 12 and 24. The magnetic field of the magnet 32 interacts with the magnetic field due to the current pulse and induces a torsional strain in the wire 12. This torsional strain generates a torsional wave in the wire which propagates simultaneously as first and second torsional waves in opposite directions along the wire 12 from the magnet 32 to the first and second ends 14 and 16, respectively, of the wire 12. The first torsional wave $t_1$ travels from the magnet 32 to the first end 14 of the wire 12 where it encounters the dampener 20 which dampens the first torsional wave $t_1$.

The second torsional wave $t_2$ propagates along the wire 12 from the magnet 32 toward the second end 16 of the wire 12 and strikes the reflective termination 16 which reflects the second torsional wave $t_2$ back along the wire 12 toward the magnet 32. When the reflected second torsional wave $t_2$ again reaches the magnet 32, it interacts with the magnetic field of the magnet 32 and induces an electromotive force, such as a electrical signal or current, in the two-wire circuit formed of the wires 12 and 24. The electrical signal passes to the circuit means 30. An amplifier may be provided in the circuit means 30 to detect and amplify the second electrical signal.

In determining the position of the magnet 32 along the length of the wire 12, it is known that the torsional waves $t_1$ and $t_2$ propagate along the wire 12 at a known velocity. The total propagation time of the second torsional wave $t_2$ is equal to the propagation time of the second torsional wave $t_2$ from the magnet 32 to the reflective termination 22 at the second end 16 of the wire 12 and the propagation time of the reflected second torsional wave $t_2$ from the reflective termination 22 back to the magnet 32.

The circuit means 30 determines the time differential between the initial application of the first excitation current signal or pulse to the circuit formed of the wire 12 and the wire 24 and the detection of the second electrical current signal. This time differential is equal to the total propagation time of the second torsional wave $t_2$. Since the velocity of the torsional waves along the wire 12 is known, the circuit 30 or an external controller can easily determine the position of the magnet 32 along the length of the wire 12 with respect to a known or reference position, such as a fixed and known position of the reflective termination 16.

Figure 2:
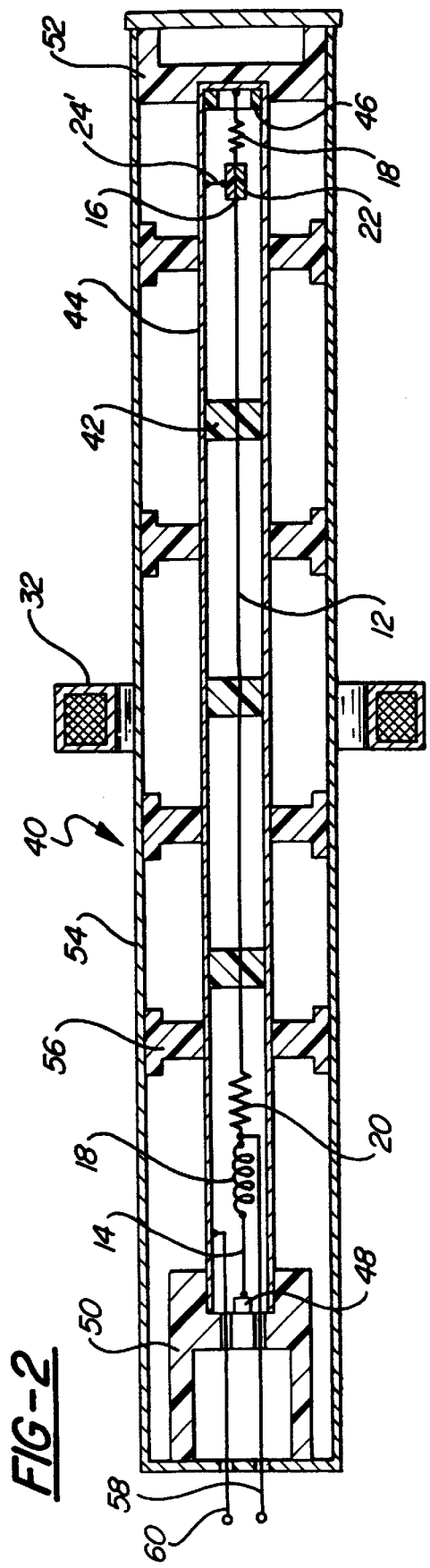
FIG. 2 is a cross-sectional view of a magnetostrictive position measurement apparatus according to the embodiment shown in FIG. 1.

Referring now to FIG. 2, there is depicted a conventional magnetostrictive waveguide position measurement apparatus 40 which includes the components of the magnetostrictive waveguide 10 described above and shown in FIG. 1, mounted within one or more tubes.

In this embodiment which is suited for use in determining a liquid level within a tank, the magnetostrictive waveguide or wire 12 is centrally mounted by means of a plurality of spaced magnetically transmissive spacers 42 within a first magnetically transmissive tube 44. The tube 44 is preferably formed of brass, stainless steel or even plastic, although non-pervious materials are generally preferred to isolate the wire 12 from the surrounding environment. The second end 16 of the wire 12 is fixedly coupled to an end cap 46 mounted on one end of the tube 44, the reflective termination or collar 22 is coupled by wire 24' to the tube 44. The first end 14 of the wire 12 and the dampener 20 and spring 18 are coupled to a suitable termination 48 at the opposite end of the tube 44. End mounts 50 and 52 are coupled to the termination 48 and the end cap 46, respectively, to centrally position the tube 44 within an outer tube or housing 54. A plurality of magnetically transmissive spacers 56 are spaced extenuously along the length of the tube 44 to centrally mount the tube 44 within the outer tube 54.

In this application, the circuit 30 may be contained within the outer tube 54 adjacent the first end 14 of the magnetostrictive wire 12. Alternately, and as shown in FIG. 2, external conductors 58 and 60 extend through the outer end of the tube 54 for connection to an external controller, not shown. The conductors 58 and 60 are connected, respectively, to the first end 14 of the wire 12, after coupling to the dampener means 20 or spring 18, and to the ground or return path through tube 44, respectively, to form the above-described two-wire current loop. The conductors 58 and 60 thereby provide a suitable path for the application of the first electrical excitation signal to the wire 12 as well as an output signal indicative of the return of the reflected electrical signal from the second end 16 of the wire 12.

Figure 3:
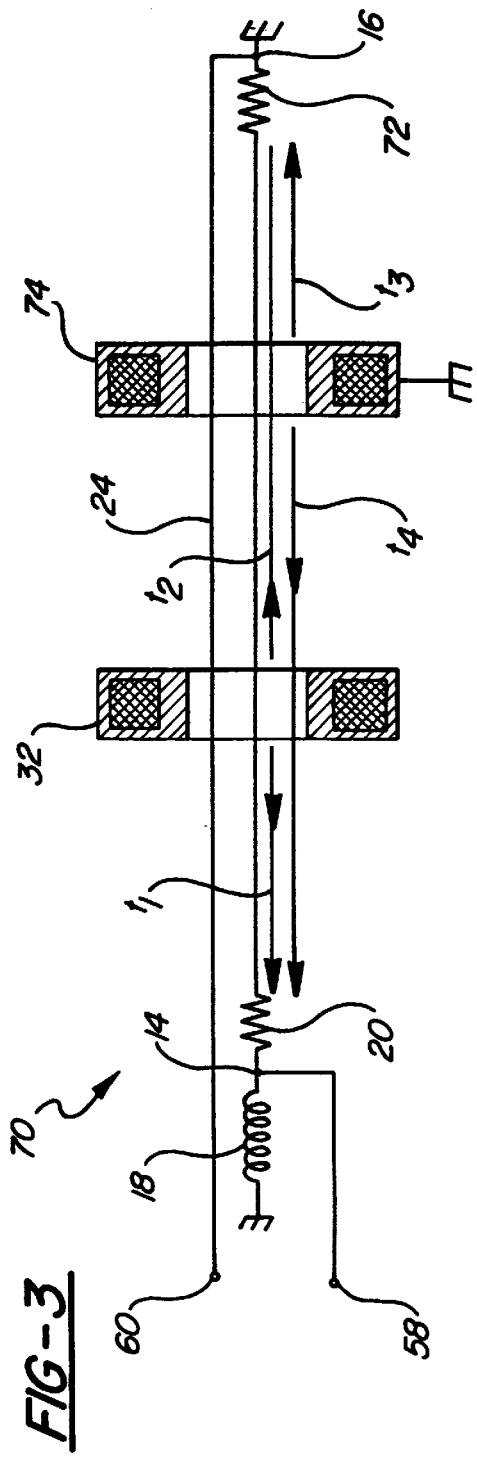
FIG. 3 is a pictorial representation of another embodiment of the magnetostrictive position measurement apparatus of the present invention.

Referring now to FIG. 3, there is depicted another embodiment of a magnetostrictive position measurement apparatus 70. The magnetostrictive position measurement apparatus 70 contains some of the same elements as the apparatus 10 described above and shown in FIGS. 1 and 2. Such common elements have been given the same reference number as in the first embodiment shown in FIG. 1 and described above.

Thus, the magnetostrictive wire 12 extends from the first end 14 to the opposed second end 16. In this embodiment, both of the first and second ends 14 and 16 are fixed or secured to a fixed surface or support. The biasing means or tension spring 18 is connected between the fixed surface and the first end 14 of the magnetostrictive wire 12. The dampener 20, such as a solder mass or resilient pad clamped to the wire 12, is mounted on the wire 12 for dampening torsional waves or sonic vibrations reaching the first end 14 of the wire 12. A second dampening means or dampener 72, which may also be formed of a pad or solder mass coupled on the wire 12, is mounted on the wire 12 immediately adjacent the second end 16 of the wire 12. The second dampening means 72 also functions to dampen sonic vibrations or torsional waves reaching the second end 16 of the wire 12.

As in the first embodiment, a conductor 58 is connected to the first end 14 of the wire 12. A return wire 24 is connected between the second end 16 of the wire 12 and a terminal 60 to form a two-wire circuit as described above. The two-wire circuit supplies excitation current to the wire 12 and receives return signals from the return wire 24 indicative of the propagation time of torsional waves on the wire 12, as described in greater detail hereafter.

In this embodiment, a second magnet 74 is fixedly mounted about the wire 12 at a reference position relative to the measurement field. The second magnet 74 is secured to a suitable surface, such as the conventional outer tube surrounding the magnetostrictive wire 12, as shown in FIG. 2. The second magnet 74 forms a fixed reference with respect to the movable magnet 32.

In operation, an excitation signal or current is applied through the conductor 58 to the wire 12 and thereby to the two-wire circuit formed of the wire 12 and the return wire 24. The magnetic field associated with this excitation signal or current interacts with the magnetic field of the magnet 32 and induces a torsional strain in the wire 12 which generates oppositely directed, simultaneously propagating first and second torsional waves $t_1$ and $t_2$. The first torsional wave $t_1$ strikes the first dampener 20 and is dampened. The second torsional wave $t_2$ propagates along the wire 12 to the second magnet 74 and the second dampener 72 at the second end 16 of the wire 12. Upon reaching the second magnet 74, the second torsional wave $t_2$ interacts with the magnetic field of the second magnet 74 and induces a first electromotive force, hereafter referred as $i_1$, which produces an electrical current in the circuit formed of the wire 12 and the return wire 24.

The excitation signal on wire 12 also instantly interacts with the magnetic field of the second magnet 74 to induce a torsional strain in the wire 12 which generates oppositely directed third and fourth torsional waves $t_3$ and $t_4$. The third torsional wave $t_3$ propagates along the wire 12 to the second end 16 of the wire 12 where it is dampened by the second dampener 72. The fourth torsional wave $t_4$ propagates along the wire 12 to the first movable magnet 72 and the first dampener 20. However, the fourth torsional wave $t_4$ interacts with the magnetic field of the first magnet 32 to induce a second electromotive force producing a second electrical current $i_2$ in the circuit formed of the wire 12 and the return wire 24. The two electromotive forces and the two resulting currents are additive to form an electromotive force or current having double the amplitude of the single electromagnetic force or current induced in the two-wire circuit in the first embodiment of the present invention described above. This leads to more easily detected return signal on the two-wire circuit.

Since the propagation time of the second torsional wave $t_2$ along the wire 12 from the first magnet 32 to the second magnet 74 is the same as the propagation time of the fourth torsional wave $t_4$ along the wire 12 from the second magnet 74 to the first magnet 32, the distance between the first and second magnets 32 and 74 can be determined by the time differential between the application of the initial excitation signal to the two-wire circuit and the detection of the return signal or induced electromagnetic forces in the two-wire circuit.

In summary, there has been disclosed a unique magnetostrictive position measurement apparatus which is capable of detecting the position of a movable object in a measurement field along the length of a magnetostrictive wire without the need for a conventional pickup element. This simplifies the construction of the magnetostrictive position measurement apparatus as well as significantly reducing its overall size, particularly at the head end of the magnetostrictive waveguide. The present magnetostrictive position measurement apparatus can also be employed in many diverse applications, particularly those which, due to size constraints, could not easily accept the large cross-section head ends in previously devised magnetostrictive waveguides.

What is claimed is:

1. A magnetostrictive position measurement apparatus comprising:

a circuit including a magnetostrictive wire having first and second opposed ends, the circuit transmitting an electrical excitation pulse and detecting a return signal indicative of the position of a first magnet along the magnetostrictive wire on the basis of the time delay between the detection of the return signal relative to the transmission of the electrical excitation pulse;

the first magnet displaceable relative to the magnetostrictive wire, the first magnet interacting with the electrical excitation pulse and generating first and second oppositely propagating torsional waves in the magnetostrictive wire; and means for reflecting the second torsional wave from the second end of the magnetostrictive wire to the first magnet wherein the magnetic field of the first magnet interacts with the second torsional wave to induce an electrical current in the magnetostrictive wire, the electrical current acting as the return signal.

2. The apparatus of claim 1 further comprising:

a dampener coupled to the first end of the magnetostrictive wire, dampening the first torsional wave at the first end of the emagnetostrictive wire.

3. The apparatus of claim 1 wherein the circuit further comprises:

means, coupled to the circuit for determining the position of the first magnet along the length of the magnetostrictive wire based on the time differential between the application of the electrical excitation to the pulse wire and the detection of the return signal in the magnetostrictive wire.

4. The apparatus of claim 1 wherein the reflecting means comprises:

a reflective termination coupled to the second end of the magnetostrictive wire.

5. The apparatus of claim 1 further comprising:

a first magnetically transmissive tube spacedly surrounding the magnetostrictive wire.

6. The apparatus of claim 5 further comprising:

a second magnetically transmissive tube surrounding the first magnetically transmissive tube.

7. A magnetostrictive measurement apparatus comprising:

a circuit including a magnetostrictive wire having first and second opposed ends, the circuit transmitting an electrical excitation pulse and detecting a return signal therefrom indicative of the position of a magnet means along the magnetostrictive wire;

a first magnet displaceable relative to the magnetostrictive wire, the first magnet interacting with the electrical excitation pulse and generating first and second oppositely propagating torsional waves in the magnetostrictive wire;

a second magnet fixedly positioned relative to the magnetostrictive wire and interacting with the electrical excitation pulse and generating third and fourth oppositely propagating torsional waves in the magnetostrictive wire; and wherein one of the first and second torsional waves and one of the third and fourth torsional waves generated by the first and second magnets, respectively, propagating on the magnetostrictive wire to the other of the first and second magnets and interacting with the magnetic field of the other of the first and second magnets to generate separate electrical currents in the magnetostrictive wire, the separate electrical currents being additive and forming the return signal.

8. The apparatus of claim 7 further comprising:

dampening means, coupled to each of the first and second ends of the magnetostrictive wire, for dampening first and third torsional waves at the first and second ends of the magnetostrictive wire, respectively.

9. A method of determining the position of a magnet along a length of wire comprising the steps of:

forming a circuit including a magnetostrictive wire having first and second ends;

exciting the circuit with an electrical excitation pulse;

movably disposing a first magnet relative to the magnetostrictive wire;

generating first and second oppositely directed torsional waves at the position of the magnet through the interaction of the magnetic field of the magnet and the magnetic field associated with the electrical excitation pulse;

reflecting the second torsional wave in the magnetostrictive wire generated by the electrical excitation pulse from the second end of the wire to the first magnet wherein the magnetic field of the first magnet means interacts with the second torsional wave to induce electrical current in the magnetostrictive wire; and determining the position of the magnet along the magnetostrictive wire based on the time differential between the transmission of the electrical excitation pulse on the circuit and the detection of the electrical current in the circuit.

10. The method of claim 9 further comprising the step of dampening the first end of the magnetostrictive wire.

11. A method of wherein the step of propagation a torsional wave determining the position of a magnet along a length of wire comprising the steps of:

forming a circuit including a magnetostrictive wire having first and second ends;

excitind the circuit with an electrical excitation pulse;

movably disposing a first magnet relative to the magnetostrictive wire;

generating first and second oppositely directed torsional waves at the position of the magnet through the interaction of the magnetic field of the magnet and the magnetic field associated with the electrical excitation pulse;

mounting a second magnet in a fixed reference position about the magnetostrictive wire;

generating third and fourth oppositely directed torsional waves propagating along the magnetostrictive wire by the interaction of the electrical excitation pulse and the magnetic field of the second magnet; and generating a first electrical current in the circuit through the interaction of the second torsional wave and the second magnet and a second electrical current in the circuit through the interaction of the fourth torsional wave and the first magnet.

12. The method of claim 11 further comprising:

adding the first and second electrical currents to form a return signal.

* * * * *